United States Patent [19]

Martin

[11] Patent Number: 5,496,922
[45] Date of Patent: Mar. 5, 1996

[54] DECOLORIZATION OF POLYSUCCINIMIDE

[75] Inventor: David A. Martin, Ballwin, Mo.

[73] Assignee: Monsanto Company, St. Louis, Mo.

[21] Appl. No.: 364,146

[22] Filed: Dec. 27, 1994

[51] Int. Cl.$^6$ ..................................................... C08G 69/10
[52] U.S. Cl. ..................... 528/490; 525/420; 528/310; 528/322; 528/328; 528/363; 528/480; 528/483
[58] Field of Search ..................................... 528/310, 328, 528/322, 480, 483, 490, 363; 525/420

[56] References Cited

U.S. PATENT DOCUMENTS

| | | | |
|---|---|---|---|
| 4,824,591 | 4/1989 | Dyroff et al. | 252/94 |
| 5,004,558 | 4/1991 | Dyroff et al. | 252/95 |
| 5,057,597 | 10/1991 | Koskan | 528/328 |
| 5,266,237 | 11/1993 | Freeman et al. | 252/542 |
| 5,292,864 | 3/1994 | Wood et al. | 528/490 |
| 5,315,010 | 5/1994 | Koskan et al. | 548/520 |
| 5,319,145 | 6/1994 | Paik et al. | 528/328 |

FOREIGN PATENT DOCUMENTS

14775/92  4/1992  Australia.

OTHER PUBLICATIONS

"Temperature Effect on the Molecular Weight and the Optical Purity of Anhydropolyaspartic Acid Prepared by Thermal Polycondensation", *Bulletin of the Chemical Society of Japan*, vol. 51 (5), 1555–1556 (1978), Kokufuta et al.

*Primary Examiner*—Shelley A. Dodson
*Attorney, Agent, or Firm*—R. Loyer

[57] ABSTRACT

There is disclosed a process for decolorizing polysuccinimide by means of contacting the polysuccinimide in the solid state with an aqueous solution of a bleach. Typically, polysuccinimide is placed into a solution of hydrogen peroxide to form a slurry with solid particles whereby the color of the polysuccinimide is greatly reduced. Separation of the bleach solution is performed easily by means of solid liquid separation such as by filtration rendering the polysuccinimide acceptable for use directly into detergent formulations.

8 Claims, No Drawings

DECOLORIZATION OF POLYSUCCINIMIDE

This invention relates to the production of polysuccinimide and, more particularly, to a process wherein the polysuccinimide is decolorized and rendered more useful in applications wherein the color of the succinimide is important.

BACKGROUND OF THE INVENTION

Polyaspartic acid has become increasingly important is recent years as a useful polymer in such areas as water treatment, detergents, cosmetics and hair treatment. In the usual thermal condensation processes to produce the polymer there is produced an initial polysuccinimide which is then hydrolyzed to produce a water soluble salt such a sodium polyaspartate. It has been often noted in the literature that the color of the polysuccinimide is related in rough manner to the time/temperature relationship in its production. For example, the color of the product from processes employing relatively longer reaction time under elevated temperature produces more darkly colored polysuccinimide than is produced With shorter reaction time and lower temperatures. A typical teaching of this phenomenon is found in a publication entitled "Temperature Effect on the Molecular Weight and the Optical Purity of Ahydropolyaspartic acid Prepared by Thermal Polycondensation" by Kokufuta et al., Bulletin of the Chemical Society of Japan, Vol. 51, pp. 1555–1556, 1978.

Many efforts have been made to lower the time/temperature relationship by employing various types of dryers that provide greater efficiency. Recent examples include U.S. Pat. No. 5,057,597, U.S. Pat. No. 5,315,010 and U.S. Pat. No. 5,319,145. In all of these patents dryers are employed in an attempt to convert aspartic acid into polyaspartic acid by thermal condensation. However, the polysuccinimide produces by such processes possess an undesirable color. The color of the polysuccinimide is transferred to the water soluble salt upon hydrolysis of the initial product.

It has been reported in the literature that the use of acidic catalysts such as phosphoric acid reduces the color of the resulting polysuccinimide. In one attempt to overcome the color problem it has been found that the polyaspartate formed by thermal polymerization followed by alkaline hydrolysis is treated with bleach in water solution. This treatment is reported to decolorize the solution of polyaspartate as noted in U.S. Pat. No. 5,292,864 to Wood, et al. However, in many instances the color of the polysuccinimide becomes a disadvantage as this initial product is employed without first converting it to the water soluble polyaspartate salt as was done in the above noted patent to Wood et al. For example, in U.S. Pat. No. 5,266,237 to Freeman et al. and Australian patent AU-A-14775/92, the polysuccinimide is added directly to other ingredients to form a detergent composition. The color of the polysuccinimide, particularly in detergent applications is desirably as colorless as possible. Thus the method of decolorizing the water solution of the salt is not useful in preparing desirable compositions of the above noted patent to Freeman et al. which incorporate the succinimide. Accordingly, there is needed a process for the decolorization of the polysuccinimide.

SUMMARY OF THE INVENTION

In accordance with this invention the color of polysuccinimide is reduces by treating the water insoluble polysuccinimide with a bleach. While the color of the polysuccinimide produced by the usual thermal condensation of aspartic acid ranges from light tan to a dark brown, the process of this invention reduces the color of the polysuccinimide to an off-white color which is greatly advantageous for use directly in detergent compositions. Briefly, the polysuccinimide is slurried in water containing an oxygen bleach at about 1% concentration. The mixture is stirred briefly as the color of the water insoluble particles of succinimide is reduced. The solid polysuccinimide is recovered by conventional means. It has been surprisingly found that the amount of color in the hydrolyzed polyaspartate salt is also reduced indicating that the color of the succinimide is a surface phenomenon easily treated with bleach.

DETAILED DESCRIPTION OF THE INVENTION

In accordance with this invention there is provided a process for reducing the color of polysuccinimide by contacting the polysuccinimide with an aqueous solution of an bleach. Typical bleaches included the preferred hydrogen peroxide but also sodium hypochlorite, ozone, peroxydicarbonate or chlorine dioxide sulfone peracids as described in U.S. Pat. Nos. 4,824,591 and 5,004,558, both to Dyroff, et al. Surprisingly, it has been found that treatment with bleach does not affect the polysuccinimide which is easily recovered from the aqueous bleach solution as it is water insoluble before and after bleach treatment.

In the practice of this invention a bleach solution is prepared by combining a water soluble bleach in an amount of from about 0.5% to about 2%, by weight. Higher concentrations of bleach material may be employed. However, further improvement in color is not expected and therefore such higher concentrations would be inefficient. Sufficient solution is employed to allow the formation of a fluid, easily stirred slurry containing the polysuccinimide. The polysuccinimide is left in the slurry for a sufficient time to reduce the color of the particles and then recovered. Usually, sufficient reduction in the color of the polysuccinimide is achieved by contacting the bleach solution for about 24 hours. Longer or shorter contact time may be employed depending upon the amount of bleach in solution and the temperature employed. In most instances ambient room temperature is employed although any suitable temperatures above ambient room temperature, such as from about 25° C. to about 100° C. may be employed.

Recovery of the polysuccinimide may be performed by conventional means such as filtration, centrifugation or drying. It is preferred to separate the polysuccinimide

DESCRIPTION OF THE PREFERRED EMBODIMENTS

EXAMPLE 1

Polysuccinimide was produced by thermal condensation of 1-aspartic acid in the presence of phosphoric acid catalyst in the amount of 15% by weight of the 1-aspartic acid. The 1-aspartic/phosphoric acid mixture was introduced into a rotary tray dryer such as is described in U.S. Pat. No. 5,319,145 to Paik et al wherein heated air at 250° C. was continuously introduced. The residence time in the rotary tray dryer was 2.5 hrs. The polysuccinimide thus produced was dark red brown in color. The polysuccinimide was finely ground and divided into three samples. The first sample, 14.39 g of polysuccinimide was hydrolyzed by combining it with 13.93 g of 50.2% sodium hydroxide in 36.83 g of water to provide a pH in the range of from 9.8–10. The aqueous solution was clear but likewise dark red brown in color. The second sample of polysuccinimide, 14.4. g, was hydrolyzed with 13.6 g of 50.2% sodium hydroxide in 36.57 g of deionized water containing 1.56 g of 30.2% hydrogen peroxide. The color of the resulting clear solution of sodium polyaspartate was light yellow. The third sample of polysuccinimide, 10.01 g, was slurried with 82.43 g of deionized water containing 0.77 g of 30.2%, by weight, hydrogen peroxide. The slurry was stirred for 24 hours at ambient room temperature. The polysuccinimide particles were recovered by filtration and exhibited a very light tan color.

EXAMPLE 2

Three samples of polysuccinimide were prepared as follows:

Sample 1—Prepared in an indirectly heated tray dryer as described in U.S. Pat. No. 5,315,010.

Sample 2—Prepared as in Sample 1 except with 9.4%, by weight, phosphoric acid catalyst present.

Sample 3—Prepared as in Example 1, no catalyst present.

Each sample was divided into two portions. One portion was treated with hydrogen peroxide as in Example 1 and the other portion tested without further treatment. The color of these samples were analyzed by means of a Hunter Labscan Spectrocolorimeter which measures the color of a solid within three spectra as follows:

White-Black termed Rd where black=0, white=100

Green-Red termed (a) where green=−8, red=+8

Yellow-Blue termed (b) where yellow=+28, blue=−28

Six grams of each particulate sample of polysuccinimide were analyzed for color as noted above employing the above noted spectrocolorimeter and the results reported in the table below.

| Sample No. | Rd | (a) | (b) |
|---|---|---|---|
| Sample 1 | 61.67 | 6.27 | 19.96 |
| Sample 1 (treated) | 92.95 | −1.95 | 8.76 |
| Sample 2 | 80.40 | 0.30 | 14.46 |
| Sample 2 (treated) | 92.14 | −2.25 | 9.48 |
| Sample 3 | 51.39 | 2.70 | 16.02 |
| Sample 3 (treated) | 72.67 | 0.54 | 14.67 |

From the data in the above table it is shown that in all samples whiteness increased with treatment in accordance with this invention. Also, in all samples red color was significantly reduced with treatment in accordance with this invention. Yellow was reduced significantly in treated samples 1 and 2.

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of this disclosure. Accordingly, modifications are contemplated which can be made without departing from the spirit of this described invention.

What is claimed is:

1. A process for increasing the whiteness of particulate polysuccinimide prepared by the thermal condensation of L-aspartic acid which comprises forming a slurry of said particles in an aqueous bleach solution for a period of time sufficient to increase the whiteness of said particles, then separating said particles from said solution.

2. The process of claim 1 wherein the bleach is an oxygen bleach.

3. The process of claim 2 wherein the oxygen bleach is hydrogen peroxide.

4. The process of claim 1 wherein the bleach is selected from the group consisting of sodium hypochlorite, ozone, peroxydicarbonate, chlorine dioxide and sulfone peracids.

5. The process of claim 1 wherein the bleach concentration in the aqueous solution is in the range of from about 0.5% to about 2%, by weight of the solution.

6. The process of claim 1 wherein the polysuccinimide is contacted with an aqueous bleach solution which is at ambient room temperature.

7. The process of claim 1 wherein the polysuccinimide is contacted with an aqueous bleach solution at a temperature in the range of from about 25° C. to about 100° C.

8. The process of claim 1 wherein the polysuccinimide is recovered from the aqueous bleach solution by means of filtration.

* * * * *